Dec. 28, 1954   L. H. FLORA   2,697,862
Apertured Clip Fastener
Filed Nov. 6, 1952
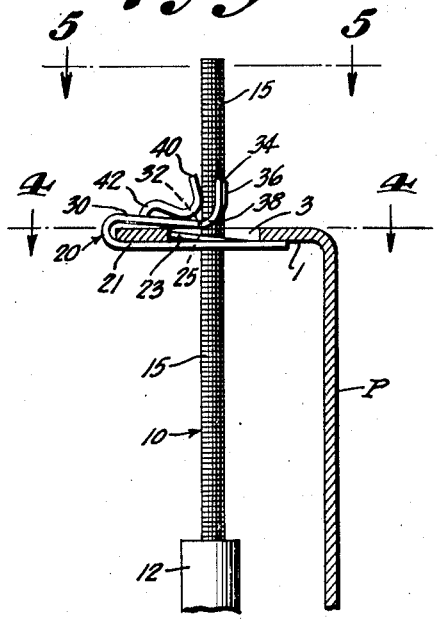
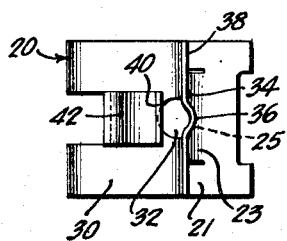
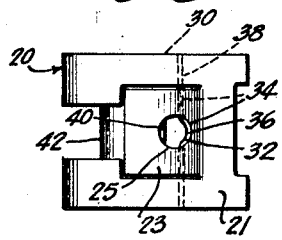
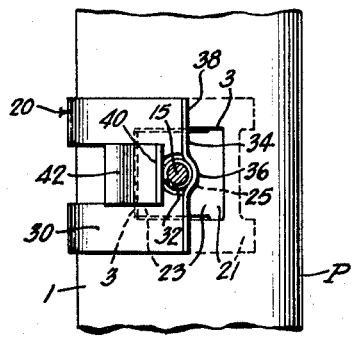
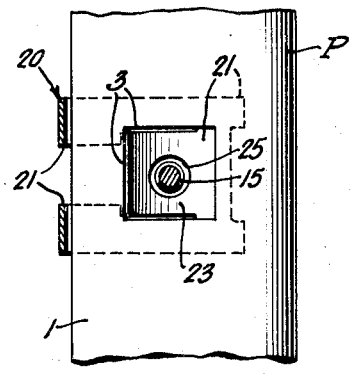
INVENTOR.
LAURENCE H. FLORA
BY
ATTORNEY

United States Patent Office 2,697,862
Patented Dec. 28, 1954

2,697,862

APERTURED CLIP FASTENER

Laurence H. Flora, Cleveland, Ohio, assignor to Tinnerman Products, Inc., Cleveland, Ohio, a corporation of Ohio Application November 6, 1952, Serial No. 319,095

5 Claims. (Cl. 24—81)

This invention relates to an improved mounting and fastener for an instrument or instrument member, or the like, comprising a cable, wire, rod or similar elongate object that is supported in generally perpendicular position on a plate or panel, or otherwise extends through an opening in the plate or panel in substantially normal relation thereto. The invention has particular application as the means for mounting or supporting instruments or instrument members such as the adjustable core of a tuning device or like control units of radio and television apparatus, for example, and otherwise, has a wide range and variety of applications and uses in assemblies wherein an elongate object is secured to a supporting plate or panel in generally normal and axially adjustable relation thereto.

A primary object of the invention is to provide an improved instrument mounting, or the like, and a fastener therefor comprising a simplified generally U-shaped spring clip having a pair of arms adapted for clasping engagement with the opposite surfaces of a supporting plate or panel in attached position, with one of said arms of the fastener including a second clip portion for supporting an instrument member or other object in generally normal relation to the supporting plate or panel.

Another object of the invention is to provide an improved instrument mounting, or the like, and a fastener therefor comprising a pair of panel clasping arms for securing the fastener to a supporting plate or panel over an opening therein with one of said arms carrying a second clip portion for supporting the instrument member or other object in said opening in generally normal and axially adjustable relation to the supporting plate or panel.

A further object of the invention is to provide such an instrument mounting, or the like, and a fastener therefor in which one or both of the panel clasping arms of the fastener are provided with means receivable in an opening in the plate or panel to lock the fastener in attached position with the second clip portion of the fastener supporting the instrument member in said opening in generally normal and axially adjustable relation to the plate or panel.

A more specific object of the invention is to provide an instrument mounting or the like, and a fastener therefor in the form of a one-piece multiple clip device having a pair of panel clasping arms, as aforesaid, with one of said arms carrying integrally formed elements bent out of the plane thereof in the same general direction to define the second clip portion of the fastener for supporting the instrument member or other object in the opening in the supporting plate or panel in generally normal and axially adjustable relation to the supporting plate or panel.

Further objects and advantages and other new and useful features in the construction, arrangement and general combination of parts of the invention will be readily apparent as the following description proceeds with reference to the accompanying drawings, for purposes of illustration but not of limitation, in which like reference characters designate like parts throughout, and in which:

Fig. 1 is a vertical sectional view of an instrument mounting comprising a fastener in the form of a generally U-shaped spring clip shown in edge elevation in applied position over an edge of a supporting plate or panel;

Fig. 2 is a plan view of the fastener per se as seen from the upper side thereof;

Fig. 3 is a plan view of the fastener per se as seen from the under side thereof;

Fig. 4 is a sectional view on line 4—4 of Fig. 1 showing the means provided on the fastener adapted to seat in the assembling opening in the supporting plate or panel for retaining the fastener in attached position and mounting an adjustable instrument member or other object extending through said assembling opening in generally normal and axially adjustable relation to said supporting plate or panel; and Fig. 5 is a view along line 5—5 of Fig. 1, looking in the direction of the arrows, and shows the fastener in top plan in applied position mounting the adjustable instrument member or other object on the supporting plate or panel.

Referring now, more particularly, to the drawings, Fig. 1 illustrates the general organization of a mounting for an instrument such as an adjustable tuning core, or the like, which is supported on a plate or panel P forming a part of a tuning yoke, or the like, in a radio or television construction, for example, or other electronic apparatus. The instrument or instrument member 10 is of the type adapted to be adjustably mounted on the flange 1 or edge portion of such a yoke or other supporting part P having a simple opening 3 provided in said flange 1 and the instrument 10 or other object secured in axially adjustable relation in such opening 3 by the improved fastener of the invention.

In the present example, the instrument 10 is illustrated as of the general kind which comprises a core or slug 12 carried on a rod or stem 15 made of coiled piano wire, for example. Such an instrument is mounted in axially adjustable relation by the rod or stem 15 in an arrangement by which the core or slug 12 is adjustable relatively to a cooperating part or body (not shown) carrying electrical windings in the manner of various instruments of this character. The arrangement, otherwise, is such that the instrument 10 is mounted by the stem 15 through a fastener 20 in accordance with the invention which is provided in the manner of a multiple clip device which serves to secure the instrument to the supporting flange or tuning yoke 1 while otherwise providing for axial adjustment of the instrument in such mounted position. The complete adjustable mounting is provided by the simplified one-piece sheet metal clip of the invention without the use of special attaching means such as grommets, bolts, screws and nuts or other extraneous fasteners.

The fastener, designated generally 20, is a simple and inexpensive article of manufacture which is made at relatively low cost from a comparatively small, inexpensive section of any suitable sheet metal, preferably of a spring metal nature such as spring steel or cold rolled metal having spring-like characteristics. The fastener, in modified forms, may be provided from sheet metal sections of various outlines, of course, but from the standpoint of economical quantity production is most advantageously formed from a generally rectangular blank obtained from standard sheet metal strip stock with a minimum loss or waste of material.

The fastener 20 is provided from a suitable blank of sheet metal bent upon itself in a return bend defining a pair of arms 21 and 30, extending in the same general direction with the end portions thereof having a normal spacing slightly less than the thickness of the flange 1 of the plate or panel P. The arrangement is such that said spaced arms 21, 30, are adapted to be spread apart to receive the edge portion of the flange 1 therebetween and to clasp the same under constant spring tension to retain the fastener firmly and rigidly in attached position. The spaced arms 21, 30, thus provided, are attached to the flange 1 over the opening 3 provided in such flange 1 in the manner of a generally rectangular slot or other suitable hole defining a combined attaching opening for the fastener 20 and a passage for the rod or stem 15 of the instrument mounted by the fastener.

In the present example, a generally rectangular opening 3 is provided in the flange 1 and the lower arm 21 of the fastener is provided with a partially severed portion defining a locking tab 23, or the like, having a generally rectangular free end corresponding substantially to the contour of said generally rectangular opening 3 but in a slightly smaller size so as to be receivable therein as shown in Figs. 1 and 4. The locking tab 23 is integral with the arm 21 adjacent the end thereof and has its free end extending toward the junction of the arms 21, 30, and bent inwardly in inclined relation in the space between said arms in a manner whereby the extremity of said tab 23 defines a locking shoulder adapted to snap into the opening 3 in abutting relation to the adjacent edge of said opening 3 to lock said arms 21, 30, in attached position on the flange 1, substantially as shown in Fig. 1. The locking tab 23, includes a suitable aperture 25 serving as a passage for the rod or stem 15 of the instrument and the complete apertured tab 23 is readily provided as a simple stamping in the arm 21 when the fastener is provided as a generally U-shaped clip in which both arms 21 and 30 are of substantially the same length. Such an apertured locking tab 23 may, of course, be provided in any other suitable similar construction and in related types of fasteners such as a J-shaped clip in which the lower or attaching arm 21 is shorter than the arm 30 and terminates in the area of the aperture 25 in the locking tab 23.

The upper arm 30 of the clip, Figs. 1, 2 and 5, is provided with an aperture 32 which is aligned with the aperture 25 in the locking tab 23 and serves as a similar passage for the stem or rod 15 of the instrument. The free end of said arm 30 is bent outwardly out of the plane thereof along a transverse line adjacent the aperture 32 to define an elongate tongue 34, or the like, extending across said arm 30. The central portion of said tongue 34 has a curved depression 36, Figs. 2 and 5, defining a rounded or curved surface corresponding to the generally round cross section of the stem or rod 15 of the instrument for snugly engaging the same. The rounded or curved inner surface of said depression 36, otherwise, is substantially concentric with the aperture 32 in said arm 30. If desired, the tongue 34 need not extend across the entire width of the arm 30, and may be provided in a smaller width by omitting unnecessary portions thereof on opposite sides of the central curved depression 36. In any event, the tongue 34 preferably is bent outwardly out of the plane of the arm 30 on a rather blunt curved portion 38 by which the leading end of said arm 30 flares outwardly from the cooperating arm 21 to provide an enlarged entrance to the space between said arms 21, 30, that facilitates the initial application of said arms 21, 30 to attached position over the edge of the flange 1 of the supporting part P, as presently to be described.

The upper arm 30 carries a cooperating tongue 40 defined by the free end of a resilient strip 42 that is partially stamped from both arms 21 and 30 and from the bight portion between said arms 21 and 30. The resilient strip 42 is integral with the upper arm 30 and has its free end provided from a severed portion in the lower arm 21 and the adjoining bight portion between said arms 21 and 30. The resilient strip 42 is formed integrally with the arm 30 in a suitable spacing from the aperture 32 in said arm. Said strip 42 is bent back upon said arm 30, substantially as shown in Figs. 1 and 2, in what may be termed an S-shaped formation in which the intermediate portion of said strip extends adjacent to or in engagement with said arm 30 adjoining the aperture 32, while the free end of said strip 42 is bent outwardly to provide the tongue 40 extending outwardly in aligned relation with said aperture 32. The tongue 40 is thus disposed in opposite spaced relation to the cooperating tongue 34 at opposite sides of the aperture 32 in the arm 30. Said tongues 34 and 40, otherwise, are disposed in alignment with the aperture 32 and are so spaced as to frictionally and grippingly engage the stem or rod 15 of the instrument which extends through said aperture 32 and between said spaced tongues 34 and 40 in the mounted position of the instrument.

The tongue 34 is more or less rigid while the tongue 40 is yieldable relatively thereto by reason of the formation thereof as the free end of the resilient strip 42. The arrangement, therefore, is such that the stem or rod 15 of the instrument is easily applied between said tongues 34 and 40 in a manner whereby the yieldable tongue 40 is readily adapted to flex and move outwardly from the other tongue 34 as necessary for said stem 15 to pass axially between said tongues 34, 40, to a position in which one side of the stem 15 is seated in the curved depression 36 of the tongue 34 and is retained therein by the tongue 40 in engagement with the opposite side of said stem 15. In applying the stem 15 between said tongues 34 and 40, the resilient strip 42 is necessarily biased outwardly and upwardly, and in attempting to assume its initial normally untensioned relation, the tongue 40 thereon engages said stem 15 under a constant compressive spring force in any position of axial adjustment of said stem 15 between said tongues 34 and 40. Thus, the stem 15 is seated in the curved depression 36 in the tongue 34 under the compressive spring force of the cooperating tongue 40 and this prevents lateral tilting or canting of that portion of the stem 15 engaged by the tongues 34 and 40.

The completed fastener 20 is composed of the multiple clip portions comprising the cooperating U-shaped attaching arms 21, 30, and the cooperating instrument securing tongues 34, 40. In providing an instrument mounting in accordance with the invention, the U-shaped attaching arms 21, 30, are applied to clasping relation over the edge of the flange 1 or other support in the area of the opening 3 therein. The edge of said flange 1 readily enters the space between said arms 21, 30, by reason of the enlarged entrance therebetween provided by the outwardly flared curved portion 38 on the upper arm 30, as aforesaid. The locking tab 23 on the lower arm 21 is inclined inwardly and upwardly from the leading end of the arm 21 toward the bight portion between said arms 21 and 30. Accordingly, as said arms 21, 30, are pushed over the edge of the flange 1, said tab 23 is cammed gradually inwardly into the plane of said arm 21 as necessary to permit said arms 21, 30 to be advanced to their fully attached position on the flange 1, as shown in Fig. 1. In this position, the locking tab 23 is aligned with the opening 3 in said flange 1 such that the free end of said tab 23 snaps inwardly into said opening 3 with the extremity thereof in abutting relation to the adjacent edge of said opening 3 to lock said arms 21, 30, to said flange 1 in the fully attached position of the fastener 20 on said flange 1.

In this fully attached position of the fastener 20 on the flange 1, the aligned apertures 25 and 32 in the arms 21 and 30, respectively, and the space between the spaced tongues 34 and 40 are all in registration with the opening 3 in said flange 1. The instrument 10 is thereupon readily assembled in secured relation with the fastener 20 simply by inserting the upper end of the stem 15 into the aperture 23 in the lower arm 20 and through the aperture 32 in the upper arm 30 where it enters into the space between the spaced tongues 34 and 40. The yieldable tongue 40 readily moves outwardly from the other tongue 34 as necessary for said stem 15 to pass axially between said tongues 34, 40, to a position in which one side of the stem 15 is seated in the curved depression 36 of the tongue 34 and is retained therein by the tongue 40 in engagement with the opposite side of said stem 15, as aforesaid. The resilient strip 42 carrying the yieldable tongue 40 is necessarily biased outwardly and upwardly, and in attempting to assume its initial normally untensioned relation, the tongue 40 thereon engages said stem 15 under continuously compressive spring force in any position of axial adjustment of said stem 15 between said tongues 34 and 40.

The stem or rod 15 of the instrument 10 or other object is readily moved axially between said tongues 34 and 40 to any desired position of adjustment, and in any setting thereof, said stem or rod 15 is seated in the curved depression 36 in the tongue 34 under a similar compressive spring force on the tongue 40. This construction prevents accidental tilting or canting of the stem or rod 15 and secures the same firmly and rigidly in perpendicular relation to the flange 1 in any setting of said stem 15 in the mounted position of the instrument 10 on said flange 1 or other supporting part.

The fastener 20 preferably is constructed of relatively thin sheet metal, the thickness of which is selected according to service requirements and the predetermined size of the parts of the mounting. The fasteners are most effective when provided of spring metal suitably treated to give the desired toughness or hardness, particularly in the case of fasteners which are used in installations where extreme vibratory motion takes place. A cheap but effective fastener may also be provided from cold rolled metal which is of a spring metal nature and capable of providing a satisfactory and reliable instrument mounting in accordance with the invention.

While the invention has been described in detail with a specific example, such example is intended as an illustration only inasmuch as it will be apparent that there are numerous possible modifications and variations in the construction, arrangement and general combination of elements and details of the present disclosure which fall within the spirit and scope of the invention.

What is claimed is:

1. A fastener comprising a sheet metal body bent to provide a pair of arms adapted to clasp the opposite sides of a support over an opening therein, one of said arms having an aperture adapted to register with said opening in the support, a pair of spaced tongues projecting outwardly out of the plane of said arm in substantial alignment with the aperture in said arm, one of said spaced tongues being yieldable with respect to the other tongue, said yieldable tongue comprising the end of a strip provided from the material of both arms of said sheet metal body, said strip having a junction with said arm in spaced relation to the aperture in said arm and extending in a return bend from said junction toward said aperture with the free end of said strip bent outwardly from adjacent said aperture to provide said yieldable tongue in substantial alignment with said aperture.

2. A fastener comprising a sheet metal body bent to provide a pair of arms adapted to clasp the opposite sides of a support over an opening therein, one of said arms having an aperture adapted to register with said opening in the support, a pair of spaced tongues projecting outwardly out of the plane of said arm in substantial alignment with the aperture in said arm, one of said spaced tongues being yieldable with respect to the other tongue, said yieldable tongue comprising the end of a strip provided from the material of both arms of said sheet metal body, said strip having a junction with said arm in spaced relation to the aperture in said arm and extending in a return bend from said junction toward said aperture with the free end of said strip bent outwardly from adjacent said aperture to provide said yieldable tongue in substantial alignment with said aperture, said other tongue comprising a portion of said arm bent outwardly from said arm adjacent said aperture therein and in substantial alignment with said aperture.

3. A fastener comprising a sheet metal body bent to provide a pair of arms adapted to clasp the opposite sides of a support over an opening therein, one of said arms having an aperture adapted to register with said opening in the support, a pair of spaced tongues projecting outwardly out of the plane of said arm in substantial alignment with the aperture in said arm, one of said spaced tongues being yieldable with respect to the other tongue, said yieldable tongue comprising the end of a strip provided from the material of both arms of said sheet metal body, said strip having a junction with said arm in spaced relation to the aperture in said arm and extending in a return bend from said junction toward said aperture with the free end of said strip bent outwardly from adjacent said aperture to provide said yieldable tongue in substantial alignment with said aperture, and the other arm being provided with a projection extending inwardly between said pair of arms and receivable in said opening in the support to retain the fastener in attached position on said support.

4. A fastener comprising a sheet metal body bent to provide a pair of arms adapted to clasp the opposite sides of a support over an opening therein, one of said arms having an aperture adapted to register with said opening in the support, a pair of spaced tongues projecting outwardly out of the plane of said arm in substantial alignment with the aperture in said arm, one of said spaced tongues being yieldable with respect to the other tongue, said yieldable tongue comprising the end of a strip provided from the material of both arms of said sheet metal body, said strip having a junction with said arm in spaced relation to the aperture in said arm and extending in a return bend from said junction toward said aperture with the free end of said strip bent outwardly from adjacent said aperture to provide said yieldable tongue in substantial alignment with said aperture, said other tongue comprising a portion of said arm bent outwardly from said arm adjacent said aperture therein and in substantial alignment with said aperture, and the other arm being provided with a projection extending inwardly between said pair of arms and receivable in said opening in the support to retain the fastener in attached position on said support.

5. A fastener comprising a sheet metal body bent to provide upper and lower arms adapted to clasp the opposite sides of a support over an opening therein, said upper arm having an aperture adapted to register with said opening in the support, a pair of spaced tongues projecting outwardly out of the plane of said arm in substantial alignment with the aperture in said arm, one of said spaced tongues being yieldable with respect to the other tongue, said yieldable tongue comprising the end of a strip provided from the material of both arms of said sheet metal body, said strip having a junction with said upper arm in spaced relation to the aperture in said arm and extending in a return bend from said junction toward said aperture with the free end of said strip bent outwardly from adjacent said aperture to provide said yieldable tongue in substantial alignment with said aperture, said other tongue comprising a portion of said upper arm bent outwardly from said upper arm adjacent said aperture therein and being provided with an outwardly curved surface in substantial alignment with said aperture, said lower arm having a partially severed portion providing a locking tab projecting inwardly between said upper and lower arms, said locking tab being receivable in said opening in the support to lock the fastener in attached position and being provided with an aperture in substantial alignment with said aperture in said upper arm.

References Cited in the file of this patent

UNITED STATES PATENTS

| Number | Name | Date |
|--------|------|------|
| 2,159,573 | Tinnerman | May 23, 1939 |
| 2,399,958 | Tinnerman | May 7, 1946 |
| 2,562,001 | Tinnerman | July 24, 1951 |
| 2,566,886 | Hartman | Sept. 4, 1951 |